US011424932B2

(12) United States Patent  
Graefe et al.

(10) Patent No.: US 11,424,932 B2  
(45) Date of Patent: Aug. 23, 2022

(54) COMMUNICATION DEVICE AND METHOD FOR AUTHENTICATING A MESSAGE

(71) Applicant: Infineon Technologies AG, Neubiberg (DE)

(72) Inventors: Andreas Graefe, Munich (DE); Laurent Heidt, Sauerlach (DE); Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 223 days.

(21) Appl. No.: 16/913,043

(22) Filed: Jun. 26, 2020

(65) Prior Publication Data

US 2020/0412543 A1 Dec. 31, 2020

(30) Foreign Application Priority Data

Jun. 26, 2019 (DE) .......................... 102019117229.2

(51) Int. Cl.
| | |
|---|---|
| *H04L 9/32* | (2006.01) |
| *G06F 21/71* | (2013.01) |
| *G06F 13/40* | (2006.01) |
| *G06F 9/30* | (2018.01) |

(52) U.S. Cl.
CPC ........ *H04L 9/3242* (2013.01); *G06F 9/30098* (2013.01); *G06F 13/4063* (2013.01); *G06F 21/71* (2013.01)

(58) Field of Classification Search  
None  
See application file for complete search history.

(56) References Cited

U.S. PATENT DOCUMENTS

| | | | |
|---|---|---|---|
| 10,321,393 B2 * | 6/2019 | Ko | ........................ H04W 12/06 |
| 2010/0128872 A1 * | 5/2010 | Cordery | ................ H04L 9/0662 |
| | | | 380/255 |
| 2016/0080375 A1 * | 3/2016 | Heidt | .................. H04L 63/0823 |
| | | | 713/171 |

(Continued)

FOREIGN PATENT DOCUMENTS

JP 2016012912 A 1/2016

*Primary Examiner* — Nelson S. Giddins  
(74) *Attorney, Agent, or Firm* — Eschweiler & Potashnik, LLC

(57) ABSTRACT

A communication device is described including a receiver configured to receive a message including message data and a message authentication code, a first register for storing a received message authentication code and a second register for storing a computed message authentication code. The device also includes a first processor configured to extract the message authentication code from the message and to store the message authentication code in the first register, a second processor configured to compute a message authentication code based on the message data and to store the computed message authentication code in the second register, and a comparing circuit configured to compare the contents of the first register and the second register and to provide a comparison result. The device includes access control circuitry configured to prevent access by the second processor to the first register and to allow access by the first processor to the first register and to prevent access by the first processor to the second register and to allow access by the second processor to the second register.

20 Claims, 7 Drawing Sheets

(56) References Cited

U.S. PATENT DOCUMENTS

| | | | |
|---|---|---|---|
| 2016/0080376 A1* | 3/2016 | Temple | ............... H04L 9/00 |
| | | | 713/170 |
| 2016/0255065 A1 | 9/2016 | Oshida | |
| 2017/0310684 A1 | 10/2017 | Wagner | |
| 2020/0117814 A1 | 4/2020 | Ito et al. | |

* cited by examiner

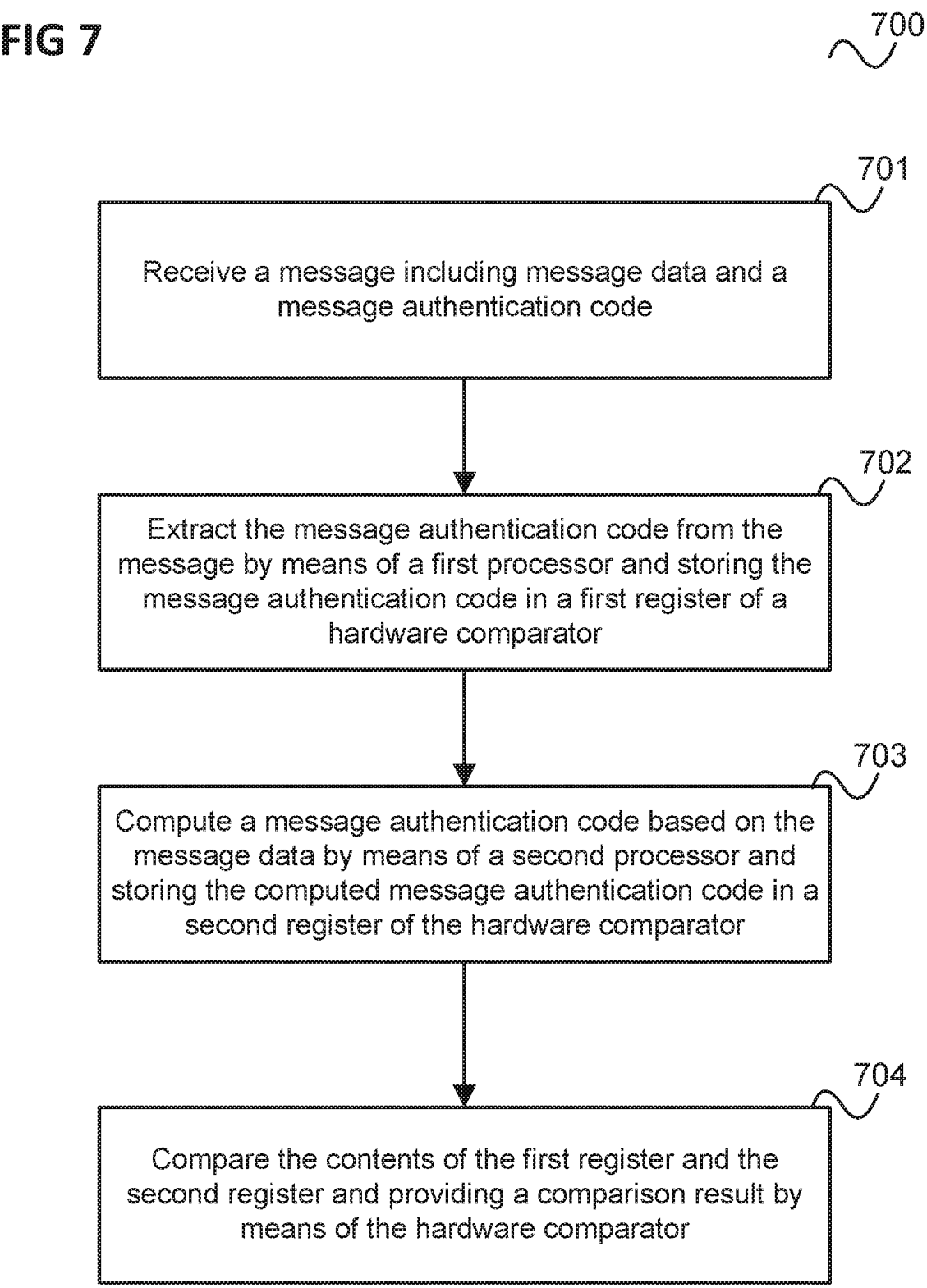

COMMUNICATION DEVICE AND METHOD FOR AUTHENTICATING A MESSAGE

REFERENCE TO RELATED APPLICATION

This application claims priority to German Application No. 10 2019 117 229.2, filed on Jun. 26, 2019, the contents of which are hereby incorporated by reference in their entirety.

FIELD

The present disclosure relates to communication devices and methods for authenticating a message.

BACKGROUND

In many applications, messages exchanged between communication devices over a communication link, e.g. a communication network such as a (computer) bus network are protected so that a recipient of such a message can check whether it is authentic, e.g. whether it came from the alleged transmitter. This is particularly important in safety-critical and security-critical applications, such as in a vehicle in which slave modules of a vehicle bus system are provided for certain control tasks (such as engine control or brake control). One way to protect messages is authentication codes such as the MAC (Message Authentication Code).

In an approach based on MAC, a receiver typically compares a received MAC with a computed MAC it has computed itself. The computation of the computed MAC is based on a cryptographic key which must be protected against attacks. This means that the MAC computation should typically be done in a secure fashion. On the other hand, the MAC comparison, i.e. the comparison of the computed MAC with the received MAC, should typically be done in a safe manner, i.e. messages should not be wrongly accepted or discarded.

To avoid excessive area and power consumption in meeting the security and safety requirements, efficient approaches for message authentication code-based authentication schemes are desirable.

SUMMARY

According to various embodiments, a communication device is provided including a receiver configured to receive a message including message data and a message authentication code, a first register for storing a received message authentication code, a second register for storing a computed message authentication code, a first processor configured to extract the message authentication code from the message and to store the message authentication code in the first register and a second processor configured to compute a message authentication code based on the message data (and for example a secret key) and to store the computed message authentication code in the second register. The device further includes a comparing circuit configured to compare the contents of the first register and the second register and to provide a comparison result, and access control circuitry. The access control circuitry is configured to prevent access by the second processor to the first register and to allow access by the first processor to the first register and to prevent access by the first processor to the second register and to allow access by the second processor to the second register.

According to a further embodiment, a method for authenticating a message according to the above communication devices is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects are described with reference to the following drawings, in which:

FIG. 7 shows a flow diagram illustrating a method for authenticating a message according to an embodiment.

DETAILED DESCRIPTION

The following detailed description refers to the accompanying drawings that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

In modern vehicles, various bus systems can be used for communicating information between various components. Examples are the CAN (Controller Area Network), Flexray and the LIN (Local Interconnect Network), which is also referred to as LIN bus. A typical field of application for such a bus system is the networking of a vehicle door, a seat, air conditioning flaps or the various light sources of an interior lighting system.

Figure 1:
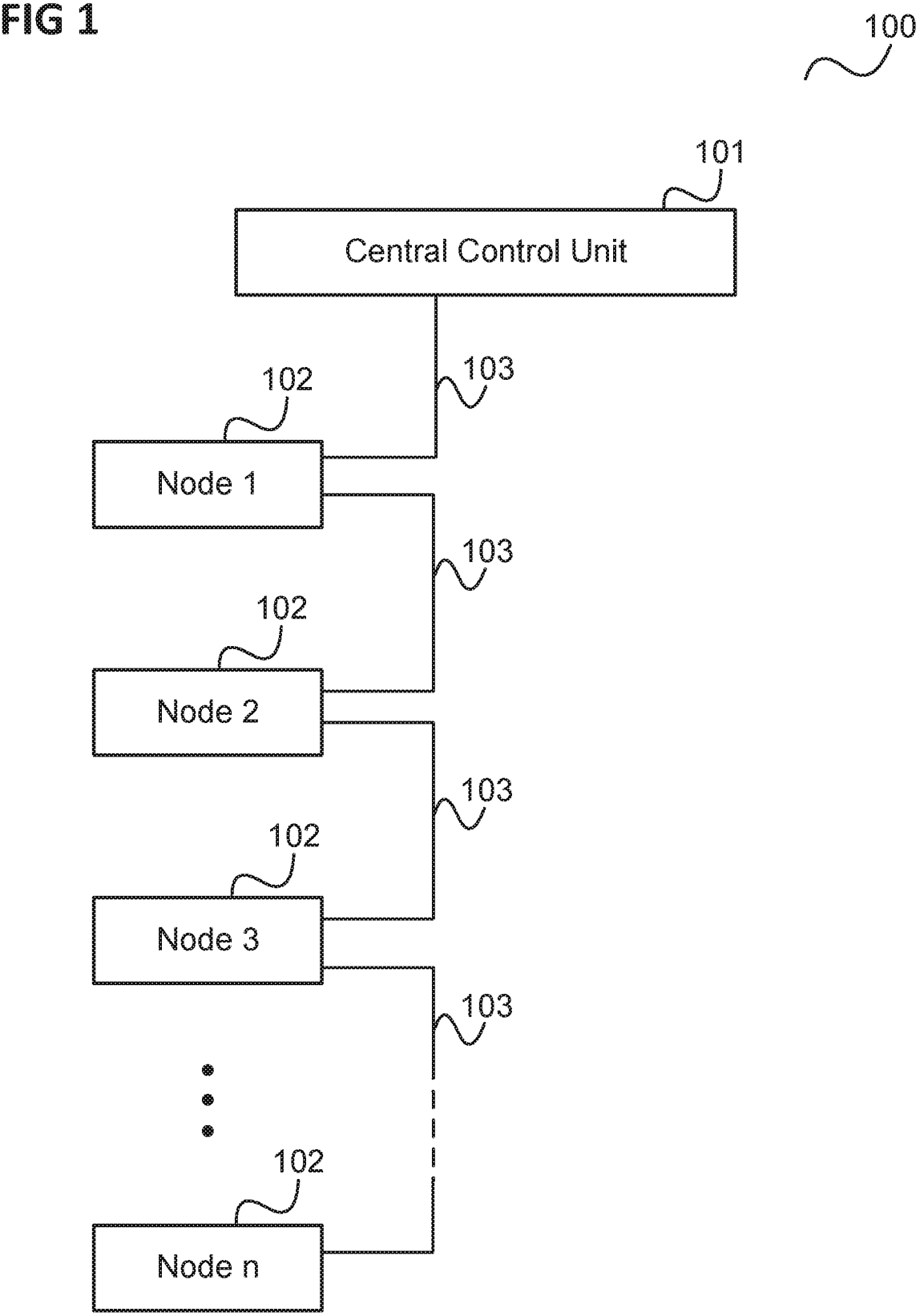
FIG. 1 shows a communications network for a vehicle.

FIG. 1 shows a communications network 100 for a vehicle.

The communication network 100 is formed by a bus master, which is formed in this example in a vehicle by a central control unit 101, and one or more slave (s), in this example, a plurality of nodes 102. The central control unit 101 and the nodes 102 are connected via a bus 103 in series.

The central control unit 101 has (as a bus master) information for scheduling the transmission between the central control unit 101 and the nodes (slaves) 102. A node 102 sends data as soon as it is requested to do so by the central control unit 101. For this purpose, the central control unit 101 sends a message header, which is identified with a specific address. In response, node 102 provides the data to be sent to bus 103. Each node 102 has a unique address via which it can be controlled by the central control unit 101.

It should be noted that embodiments of the disclosure are not limited to the above case of strict master-slave communication, which is intended to serve as a possible embodiment only. Embodiments are applicable to any type of communication with messages.

The modules (i.e. the central controller 101 and the nodes 102) each have a transceiver that translates the data to be transmitted (e.g. from a microcontroller of the module) into 12V signals, which then transmit via the bus 103 to another module. In the case of an application in a door or a seat of a vehicle, these may be various nodes (slaves) 102 communicating over the bus.

In the case of air conditioning or (indoor) lighting, the slaves 102 are usually identical. For example, the communications network 100 may include a plurality of identical slaves 102, each controlling a climate door and each having its own (micro) controller, power supply, and LIN transmitter/receiver. For example, in the case of interior lighting, communication network 100 includes a plurality of identical slaves 102, each slave 102 having a printed circuit including an LED, a power supply, a microcontroller, and a LIN transmitter/receiver. In both applications, air conditioning and lighting, a variety of such identical modules can be used, for example more than 30.

In a communication network as shown in FIG. 1, it is typically provided that the participating modules check the authenticity of incoming messages. This is especially important if a module has safety-related tasks, e.g. the control of the brake of the vehicle.

Figure 2:
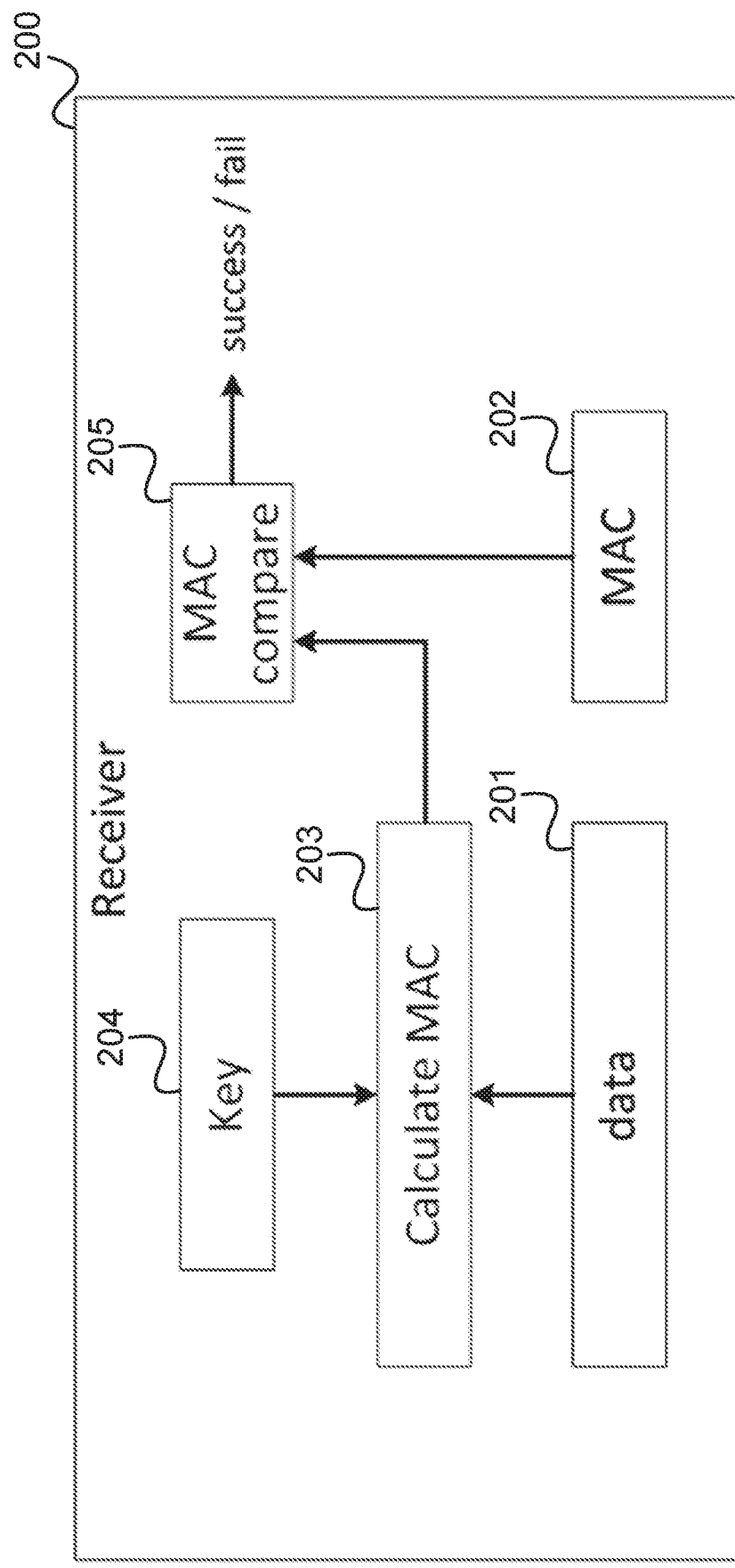
FIG. 2 shows a flow diagram illustrating a message authentication performed by a receiver.

FIG. 2 shows a flow diagram 200 illustrating a message authentication performed by a receiver.

The receiver may correspond to a component of a vehicle receiving a message from another component of the vehicle, e.g. to the master 101 or to one of the slaves 102.

The message includes data 201 and a MAC 202 generated by the sender of the message based on an algorithm for calculating a MAC, e.g. a HMAC (Keyed-Hash Message Authentication Code).

Based on the same MAC algorithm, the receiver calculates, in 203, a MAC based on the received data 201 and a cryptographic key 204. In 205, the receiver compares the calculated MAC with the received MAC 202. If the calculated MAC matches the received MAC, the receiver considers the message as being successfully authenticated and further processes the message (e.g. performs operations according to the data 201). If the calculated MAC does not match the received MAC the authentication has failed and the receiver, for example, discards the message.

Thus, to check the integrity and authenticity of a received message, the receiver calculates the Message Authentication Code (MAC) from the received data 201 (and optional additional data, e.g. freshness values, timestamps etc.) and then compares the computed MAC with the received MAC 202, which was transmitted along with the message. In automotive applications this MAC comparison has to fulfill hard safety requirements to prevent a non-authentic message from erroneously being marked as authentic.

For security reasons (e.g. secure key handling) the MAC is typically calculated on the receiver side by a CPU (central processing unit, generally a processor) within a secure domain like an HSM (Hardware Security Module). Due to limitations of area and power consumption such a CPU may be a CPU that is not safe. In that case, the MAC comparison cannot be performed in a safe way by software using this secure CPU. On the other hand, to avoid a possibility that malicious software of the unsecure CPU(s) could forge messages, both the key used to calculate the MAC and the calculated MAC itself are typically not allowed to leave the secure domain. Thus, it is usually not desirable that the MAC calculation and the MAC comparison be done by a safe CPU that is not secure.

According to various embodiments, to allow a secure MAC calculation and a safe MAC comparison without excessive area and power consumption, a hardware module is introduced which performs the comparison of two MAC values in a safe way and which is connected (e.g. via a bus), to multiple processors (e.g. CPUs in an electronic control unit (ECU) of a vehicle), which may include a safe CPU and a secure CPU and which may access the hardware module.

Figure 3:
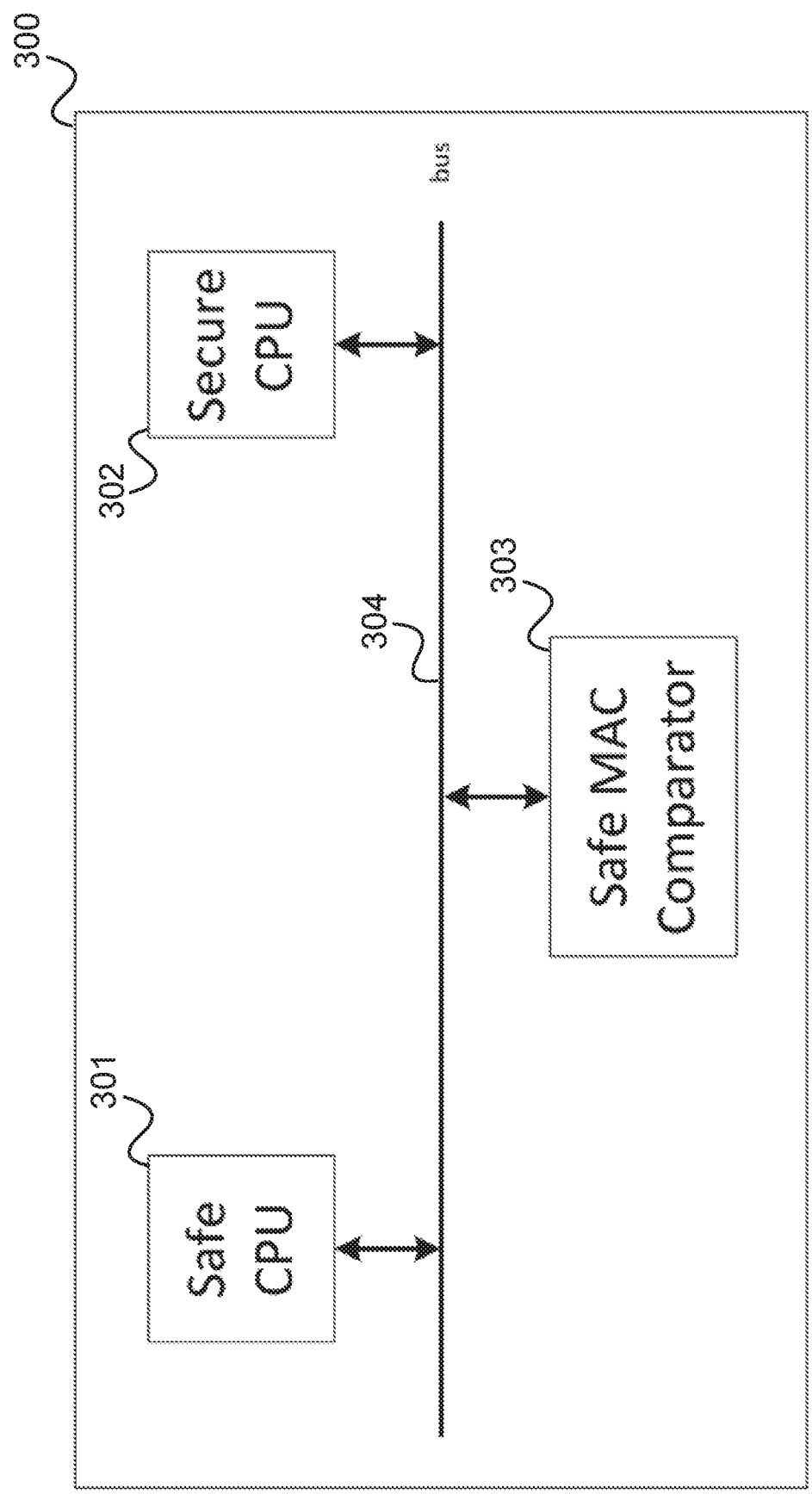
FIG. 3 shows components of a receiver according to an embodiment.

FIG. 3 shows components of a receiver 300 according to an embodiment.

The receiver 300 includes a safe (but non-secure) CPU 301 and a secure (but non-safe) CPU 302 connected to a computer bus 304. It should be noted that there may be multiple safe (but non-secure) CPUs 301 and possibly also multiple secure (but non-safe) CPUs 302. When in the following reference is made to a single CPU this may also be applied to multiple CPUs.

The CPU 301 may be implemented or operated as safe CPU by performing its operations in a redundant manner. For example, it may implement a lockstep mechanism including two processing cores which are identical to each other in terms of hardware and executed code and which are arranged in a lockstep configuration.

The CPUs 301, 302 may execute software (i.e. program code) and perform operations according to the executed software. For example, the safe CPU 301 takes care of communication tasks, e.g. according to CAN bus or Ethernet communication, in particular reception of messages, extraction of message data and MACs from received messages and, if a received message is successfully authenticated, further processing of the received message (e.g. performing control operations in a vehicle according to the received message). The secure CPU 302 may for example calculate the MAC for a received message, i.e. the MAC to be compared with the received MAC included in a received message for authenticating the message.

The safe CPU 301 may be configured to forward data extracted from a message to the safe CPU 302 to allow it to calculate the MAC. The safe CPU 301 may further transmit the current MAC size, i.e. the length of the MAC to be compared, to the secure CPU 302.

Further, the receiver 300 includes a hardware comparator 303 which is also connected to the computer bus 304 and which may be accessed by the CPUs 301, 302.

Figure 4:
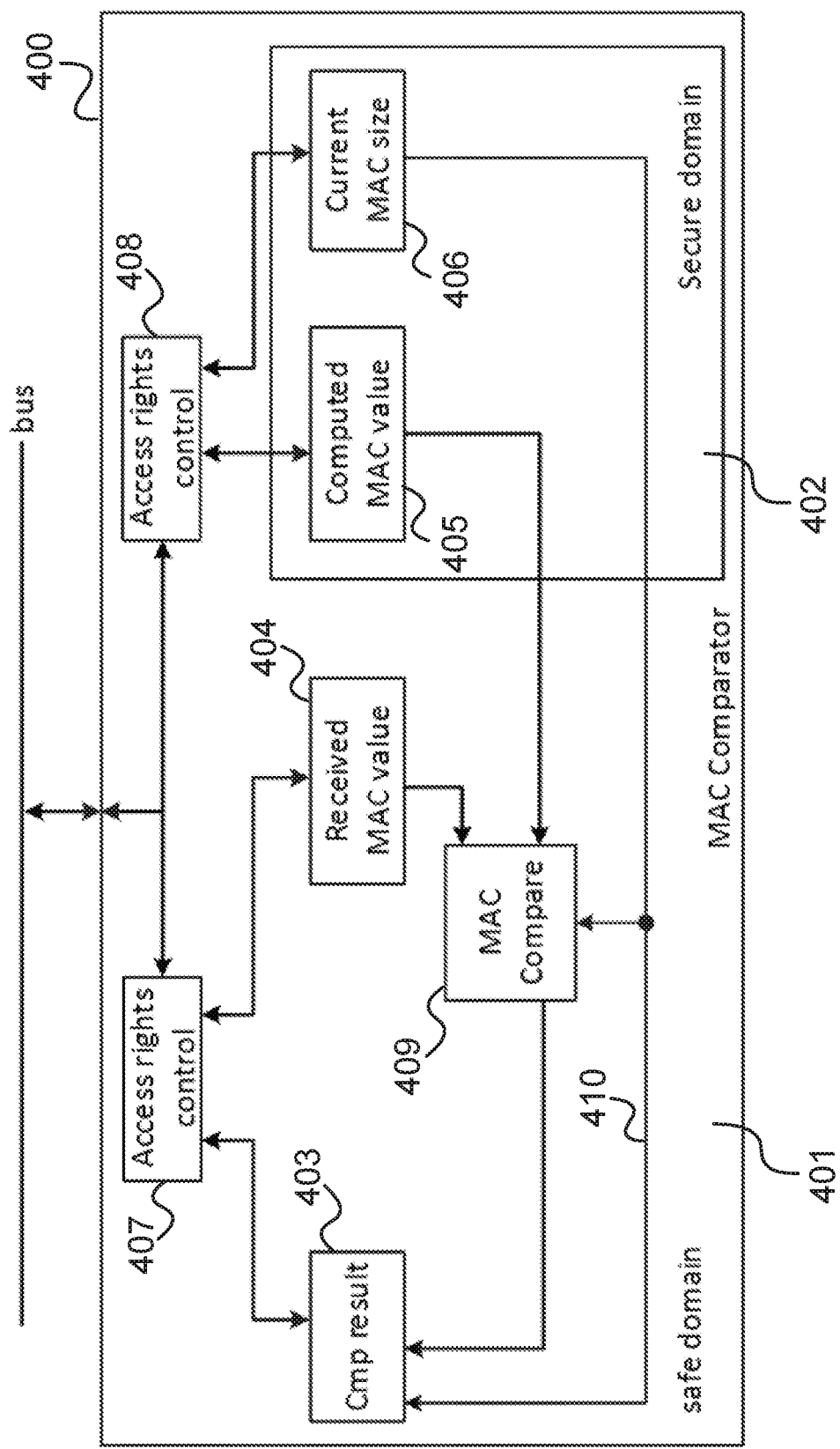
FIG. 4 shows an example of a hardware MAC comparator according to an embodiment.

FIG. 4 shows an example of a hardware MAC comparator 400 according to an embodiment.

The MAC comparator 400 includes a safe domain 401 and a secure domain 402, each of which contain certain software accessible registers: a first register 403, a second register 404, a third register 405 and a fourth register 406.

The access to those registers 403-406 is controlled by access right management implemented by access right management circuits 407, 408. The access right management ensures that only the secure CPU 302 is able to access the registers 405, 406 in the secure domain 402 while the safe but unsecure CPU 301 can access the registers 403, 404 in the non-secure (but safe) domain 401.

The secure domain 402 contains the third register 405 in which the computed MAC value is stored. Because the size of the received MAC value can vary for different messages, the size of the MAC is also stored in the secure domain 402, namely in the sixth register 406. The sixth register 406 is located within the secure domain 402 to prevent malicious code executed on the safe but non-secure CPU 301 from weakening the authentication check by reducing the MAC size.

The safe domain 401 contains the second register 404 to store the received MAC of a received message and the first register 403 in which the comparison result of the comparison between a computed MAC (stored in the third register 405) and a received MAC (stored in the second register 404) by a comparing circuit 409. The first register 403, i.e. the comparison result register, shows a "fail" comparison result when it is reset or cleared.

According to an embodiment, the comparing circuit 409 is implemented as a hardware circuit, which may for example perform a bitwise XOR of the received MAC value and the computed MAC value (by a plurality of XOR gates) followed by an OR tree (i.e. tree of OR gates) by which it is determined whether any of the XOR results is 1 (which indicates a comparison (and authentication) fail) or all are zero (which indicates a comparison (and authentication) pass).

The comparing circuit 409 may take into account the current MAC size. For example, the comparing circuit 409 may limit the bits compared of the received MAC value and the computed MAC value 405 to a number of bits given by the current MAC size by filtering XOR gates, e.g. by masking the result of XOR gates fed to the OR tree which do not correspond to bits to be compared. The masking of a result may be performed by a simple circuit (e.g. a gate) depending on how the current MAC size is represented.

The hardware comparator 400 may be implemented in a safe manner. For example, it may contain multiple comparison circuits (e.g. each including XORs, an OR tree and masking circuits as described above) and there is a circuit configured to compare the results of all comparison circuits and to output an error signal if the results do not match. Another possibility is, e.g. in case of three or more comparison circuits, that a hardware circuit is provided which is configured to determine the comparison result stored in 403 by a majority decision of the comparison circuits, i.e. by selecting the result given by most of the comparison circuits.

Thus, both MAC values (computed and received) are fed into the hardware comparator 400 along with the size of the MACs (of the fourth register 406). The result (match/mismatch, i.e. success/fail) is transferred into the comparator result register 403. Also, the size of the comparison may be stored in the result register 403 (as indicated by line 410). In this way the safe CPU 301 can, by reading out the result register 403, for example validate that the size value was not disturbed by a fault in the (unsafe) secure CPU 302.

Figure 5:
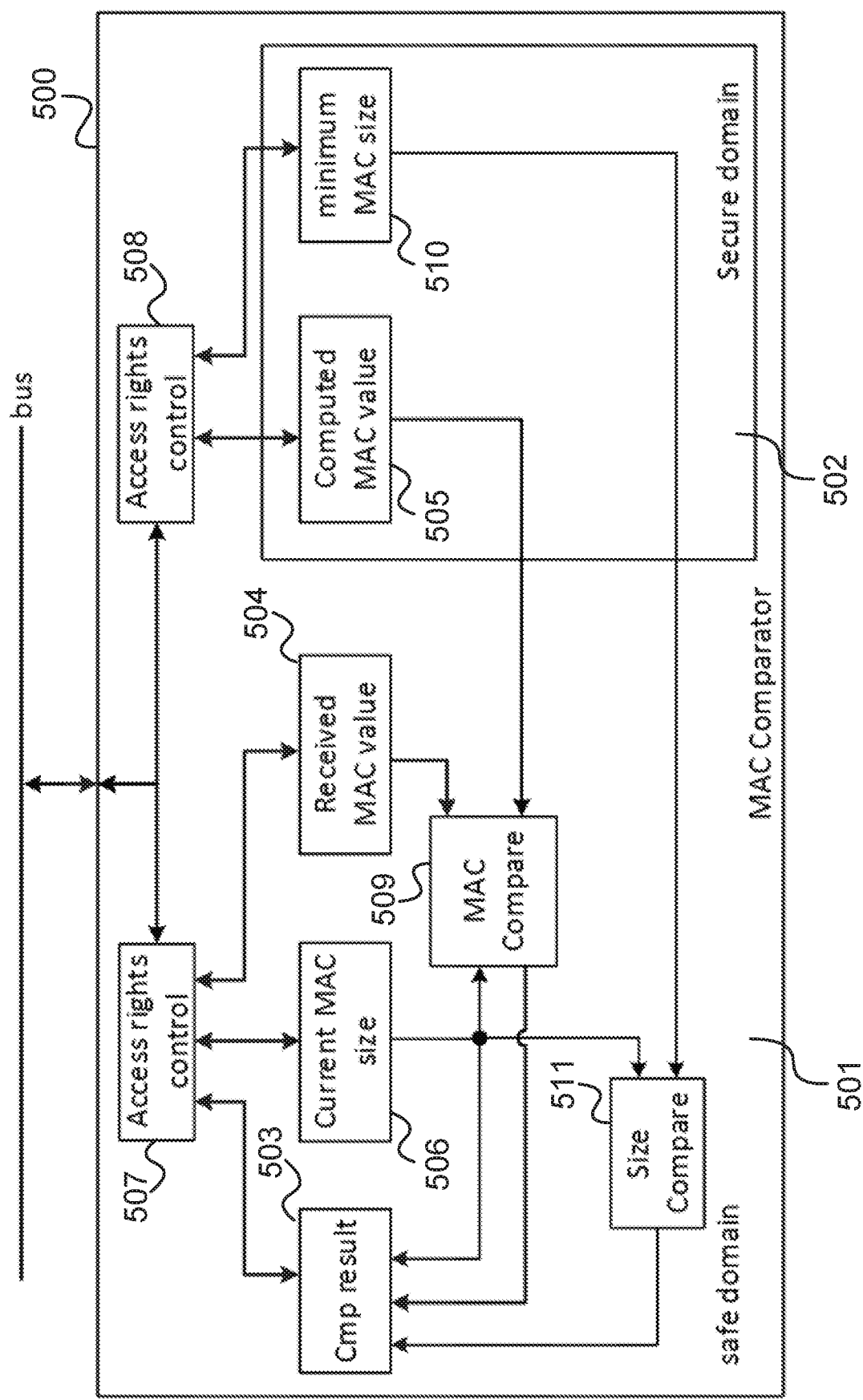
FIG. 5 shows an example of a hardware MAC comparator according to another embodiment.

FIG. 5 shows an example of a hardware MAC comparator 500 according to another embodiment.

Similar to the MAC comparator 400 of FIG. 4, the MAC comparator 500 includes a secure domain 502 and a safe domain 501, each of which contain software accessible registers, namely a first register 503, a second register 504, a third register 505 and a fourth register 506, the access to which is controlled by access right management circuits 507, 508. Further, as the MAC comparator 400, the MAC comparator 500 includes a comparing circuit 509, e.g. implemented by a plurality of XOR gates coupled to an OR tree as described in context of FIG. 4.

In contrast to the MAC comparator 400, in the MAC comparator 500 the fourth register 506 is located in the safe domain 501 instead of the secure domain 502 (i.e. the current MAC size is defined by the safe domain of the overall system (i.e. receiver 300), e.g. by the first CPU 301). Further, the secure domain 502 includes a fifth register 510 which stores a minimum MAC size. The second access right management circuit 508 restricts access to the fifth register 510 to the secure CPU 302 (i.e. the secure domain of the overall system defines a minimum size for the current MAC comparison).

The MAC comparator 500 includes a size comparison circuit 511 in the safe domain 501 which is configured to compare the current MAC size (stored in the fourth register 506) with the minimum MAC size (stored in the fifth register 511) and, depending on the result of the size comparison of the current MAC size with the minimum MAC size, to change the MAC comparison result output by the MAC comparison circuit 509 and stored in the first register 503.

Specifically, the size comparison circuit 511 sets the MAC comparison result to fail if the current MAC size (configured by the safe domain) is smaller than the minimum size (defined by the secure domain). Thus, it can be avoided that an attacker "feeds" the MAC comparator 500 with short MACs and successively spies out valid partial words of a longer MAC.

According to various embodiments, to fulfill higher safety requirements additional mechanisms may be included, for example the reset of the comparator result register 403, 503 whenever a write access to the received MAC register 404, 504 occurs.

Figure 6:
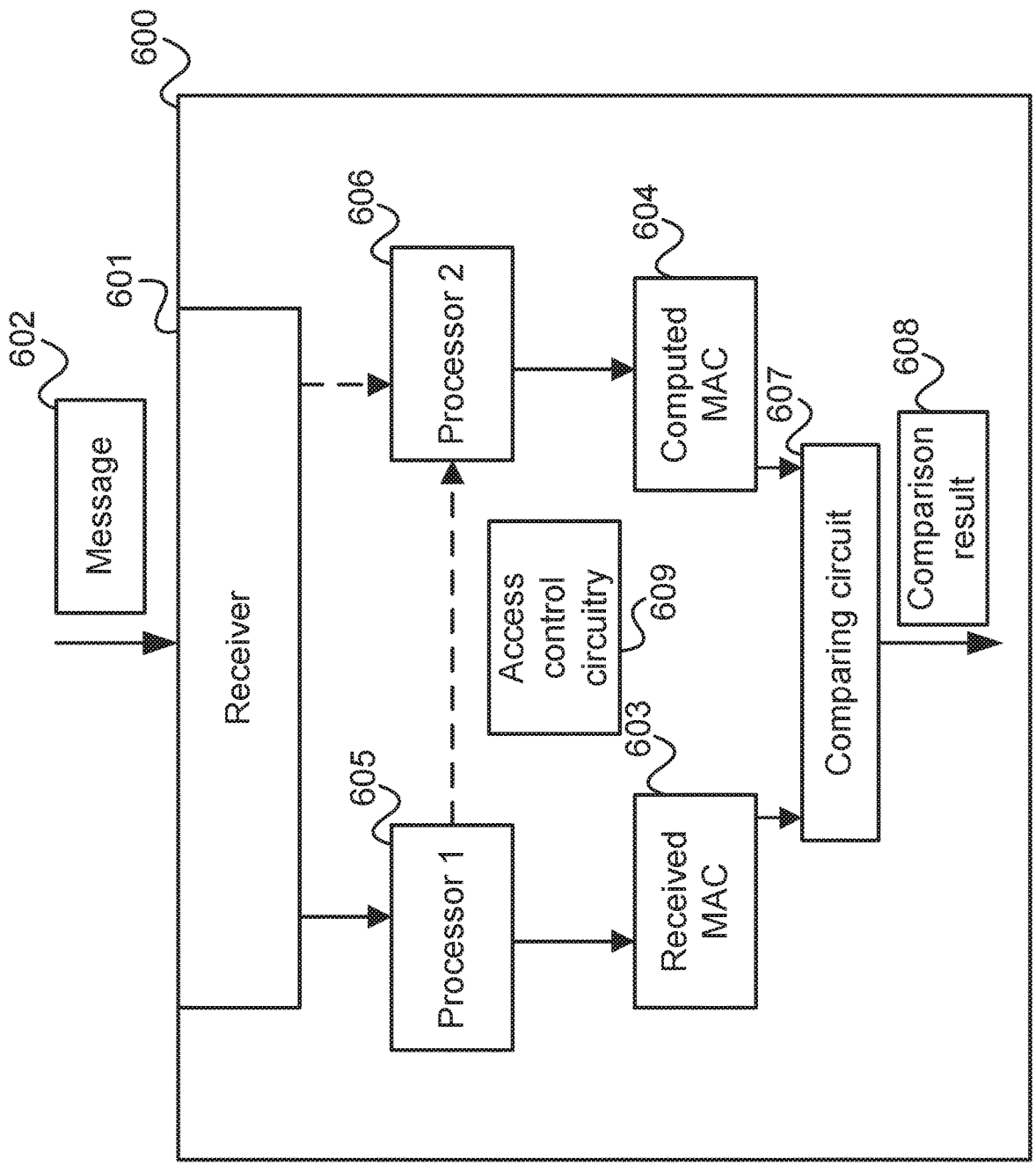
FIG. 6 shows a communication device according to an embodiment.

In summary, according to various embodiments, a communication device is provided as illustrated in FIG. 6.

FIG. 6 shows a communication device 600 according to an embodiment.

The communication device 600 includes a receiver 601 configured to receive a message 602 including message data and a message authentication code.

The communication device 600 further includes a first register 603 for storing a received message authentication code and a second register 604 for storing a computed message authentication code.

Further, the communication device 600 includes a first processor 605 configured to extract the message authentication code from the message and to store the message authentication code in the first register 603 and a second processor 606 configured to compute a message authentication code based on the message data (and for example a secret key) and to store the computed message authentication code in the second register 604.

The communication device 600 further includes a comparing circuit 607 configured to compare the contents of the first register 603 and the second register 604 and to provide a comparison result 608 (e.g. to the first processor or to a further component of the communication device 600, e.g. a further processor).

Additionally, the communication device 600 includes access control circuitry 609 configured to prevent access by the second processor 606 to the first register 603 and to allow access by the first processor 605 to the first register 603 and to prevent access by the first processor 605 to the second register 604 and to allow access by the second processor 606 to the second register 604.

According to various embodiments, in other words, a communication device, e.g. a hardware comparator of the communication device including a comparison circuit, is provided with a register to store a received message authentication code and a register to store a computed authentication code which are provided by two different processors. The comparing circuit compares the contents of the registers and provides a comparison result based on the comparison. For example, the comparison result is negative if contents of the first register and the second register do not match and is positive if the contents of the first register and the second register match.

The first register and the first processor may be considered to belong to a safe domain of the communication device and the second register and the second processor can be considered to belong to a secure domain of the communication device. In particular, the first processor may be a safe processor, e.g. provided with safety mechanisms such as redundant computation or execution of software, and the second processor may be a secure processor. For example, the second processor may only execute software stored in a secure memory, i.e. not be accessible by software which is not part of the secure domain. Thus, the approach of FIG. 5 can be seen to involve a combination of a safe domain and a secure domain (in particular in the hardware comparator) which allows a safe message authentication without disclosing confidential information like a key (which the second processor uses for message authentication code computation) or the computed message authentication code.

The safe domain (such as the first register) may be accessed by the first processor but not the second processor (to protect safety) and the secure domain (such as the second register) may be accessed by the second processor but not the first processor (to protect security). In general, the safe domain must not be accessed by the secure processor (to protect safety) and the secure domain must not be accessed by the safe processor (to protect security). The MAC comparison is performed in a safe manner (e.g. using some redundancy mechanism).

This allows using any desired crypto algorithm by performing it on the second (secure) processor while still having an efficient and safe comparison. This in particular allows a future proof architecture (crypto-agility).

According to various embodiments, the computed message authentication code is stored in the secure domain to prevent a malicious software on the safe processor from forging messages. For example, if the safe processor had access to a register storing the computed message authentication code, any malicious software on that processor could generate a wrong/malicious message, send it to the secure domain for verification. Then it could load the MAC value which was computed by the secure processor and send out the message to other receivers thus causing potential harm due to the wrong/malicious content of the message. Since the MAC value was computed by the secure processor using the secret key, the MAC value fits to the forged message. Therefore any receiver of the forged message is not able to detect its wrongness.

The processors may be separate hardware devices, e.g. implemented by different chips, and may for example be connected by a computer bus. However, the processors may also be implemented on the same chip but nevertheless be separate processing devices, e.g. with separate respective registers (that can be accessed by one but not the other processor), separate ALUs (arithmetic logic units), separate instruction caches etc. The code for the two processors may be stored in separate memory areas.

The second processor may receive the message data from the first processor or directly (or indirectly) from the receiver.

It should be noted that when reference to a received message authentication code or a computed message authentication code this is understood as a received message authentication codeword or value (or at least as a codeword or value received as such—possibly the received word is not a valid codeword) and a computed message authentication codeword or value, respectively.

In one embodiment the comparing circuit may be directly coupled with the first register and the second register to directly read out the contents of the first register and the second register for comparison. For example, the comparing circuit may have a signal line (or multiple signal lines) to each of the first register and the second register. Direct coupling and directly reading out may, for example, be understood as the connection between the first register and the second register and the comparing circuit (e.g. the OR tree as described above) being free of further registers.

According to various embodiments, a method is carried out as illustrated in FIG. 7.

FIG. 7 shows a flow diagram 700 illustrating a method for authenticating a message, e.g. carried out by a receiving communication device.

In 701, a message including message data and a message authentication code is received.

In 702, the message authentication code is extracted from the message by means of a first processor and the message authentication code is stored in a first register of a hardware comparator.

In 703, a message authentication code is computed based on the message data by means of a second processor and the computed message authentication code is stored in a second register of the hardware comparator.

In 704, the contents of the first register and the second register are compared and a comparison result is provided by means of the hardware comparator.

The method further includes that access by the second processor to the first register is prevented, access by the first processor to the first register is allowed, access by the first processor to the second register is prevented and access by the second processor to the second register is allowed.

Various Examples are described in the following:

Example 1 is a communication device as illustrated in FIG. 6.

Example 2 is the communication device of Example 1, wherein the first processor is configured to extract the message data from the message and provide the message data to the second processor.

Example 3 is the communication device of Example 1 or 2, wherein the second processor has exclusive access to the second register.

Example 4 is the communication device of any one of Examples 1 to 3, wherein the first processor has exclusive access to the first register.

Example 5 is the communication device of any one of Examples 1 to 4, wherein the first processor is configured to process the comparison result.

Example 6 is the communication device of any one of Examples 1 to 5, wherein the first processor is configured to accept the message as valid message if the comparison result is positive.

Example 7 is the communication device of any one of Examples 1 to 6, including a hardware comparator including the first register, the second register and the comparing circuit.

Example 8 is the communication device of Example 7, wherein the first processor and the second processor are coupled to the hardware comparator by means of a bus.

Example 9 is the communication device of Example 7 or 8, wherein the hardware comparator includes a result register and is configured to store the comparison result in the result register.

Example 10 is the communication device of any one of Examples 7 to 9, wherein the access control circuitry is configured to allow access by the first processor to the result register.

Example 11 is the communication device of any one of Examples 1 to 10, wherein the first processor is a safe processor.

Example 12 is the communication device of any one of Examples 1 to 11, wherein the first processor implements a redundancy mechanism for ensuring safety.

Example 13 is the communication device of Example 12, wherein the redundancy mechanism is a mechanism not implemented by the second processor.

Example 14 is the communication device of any one of Examples 1 to 13, wherein the second processor is a secure processor.

Example 15 is the communication device of any one of Examples 1 to 14, including a hardware security module including the second processor.

Example 16 is the communication device of Example 15, wherein the first processor is arranged outside of the hardware security module.

Example 17 is the communication device of any one of Examples 1 to 16, including a counter configured to count a number of comparisons with negative comparison result and to generate an alarm signal when the number of times exceeds a predetermined value.

Example 18 is the communication device of any one of Examples 1 to 17, wherein the comparing circuit is configured to, after comparing the contents of the first register and the second register, wait for an update of the contents of both the first register and the second register before again comparing the contents of the first register and the second register.

Example 19 is the communication device of any one of Examples 1 to 18, wherein the first processor is configured to execute a first computer program and is configured to extract the message authentication code from the message, to store the message authentication code in the first memory area and to process the comparison result in accordance with the first computer program.

Example 20 is the communication device of any one of Examples 1 to 19, wherein the second processor is configured to execute a second computer program and is configured to compute the message authentication code based on the message data and to store the computed message authentication code in the second register in accordance with the second computer program.

Example 21 is a method for authenticating a message as illustrated in FIG. 7.

Example 22 is the method of Example 21, including the first processor extracting the message data from the message and provide the message data to the second processor.

Example 23 is the method of Example 21 or 22, wherein the second processor has exclusive access to the second register.

Example 24 is the method of any one of Examples 21 to 23, wherein the first processor has exclusive access to the first register.

Example 25 is the method of any one of Examples 21 to 24, including the first processor processing the comparison result.

Example 26 is the method of any one of Examples 21 to 25, including the first processor accepting the message as valid message if the comparison result is positive.

Example 27 is the method of any one of Examples 21 to 26, including a hardware comparator which includes the first register and the second register performing the comparing.

Example 28 is the method of Example 27, wherein the first processor and the second processor are coupled to the hardware comparator by means of a bus.

Example 29 is the method of Example 27 or 28, wherein the hardware comparator includes a result register and stores the comparison result in the result register.

Example 30 is the method of any one of Examples 27 to 29, including allowing access by the first processor to the result register.

Example 31 is the method of any one of Examples 21 to 30, wherein the first processor is a safe processor.

Example 32 is the method of any one of Examples 21 to 31, wherein the first processor implements a redundancy mechanism for ensuring safety.

Example 33 is the method of Example 32, wherein the redundancy mechanism is a mechanism not implemented by the second processor.

Example 34 is the method of any one of Examples 21 to 33, wherein the second processor is a secure processor.

Example 35 is the method of any one of Examples 21 to 34, wherein the second processor is part of a hardware security module.

Example 36 is the method of Example 35, wherein the first processor is arranged outside of the hardware security module.

Example 37 is the method of any one of Examples 21 to 36, including counting a number of comparisons with negative comparison result and generating an alarm signal when the number of times exceeds a predetermined value.

Example 38 is the method of any one of Examples 21 to 37, including, after comparing the contents of the first register and the second register, waiting for an update of the contents of both the first register and the second register before again comparing the contents of the first register and the second register.

Example 39 is the method of any one of Examples 21 to 38, wherein the first processor executes a first computer program and extracts the message authentication code from the message, stores the message authentication code in the first memory area and processes the comparison result in accordance with the first computer program.

Example 40 is the method of any one of Examples 21 to 39, wherein the second processor executes a second computer program and computes the message authentication code based on the message data and stores the computed message authentication code in the second register in accordance with the second computer program.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:
1. A communication device, comprising:
  a receiver configured to receive a message including message data and a message authentication code;
  a first register configured to store a received message authentication code based on the received message;

a second register configured to store a computed message authentication code based on the received message;

a first processor configured to extract the message authentication code from the received message and to store the message authentication code in the first register;

a second processor configured to compute a message authentication code based on the received message data and to store the computed message authentication code in the second register;

a comparing circuit configured to compare the contents of the first register and the second register and to provide a comparison result based on the comparison; and access control circuitry configured to prevent access by the second processor to the first register and to allow access by the first processor to the first register, and to prevent access by the first processor to the second register and to allow access by the second processor to the second register.

2. The communication device of claim 1, wherein the first processor is configured to extract the message data from the message and provide the message data to the second processor.

3. The communication device of claim 1, wherein the second processor has exclusive access to the second register.

4. The communication device of claim 1, wherein the first processor has exclusive access to the first register.

5. The communication device of claim 1, wherein the first processor is configured to process the comparison result.

6. The communication device of claim 1, wherein the first processor is configured to accept the message as a valid message if the comparison result is positive.

7. The communication device of claim 1, further comprising a hardware comparator comprising the first register, the second register and the comparing circuit.

8. The communication device of claim 7, wherein the first processor and the second processor are coupled to the hardware comparator by means of a bus.

9. The communication device of claim 7, wherein the hardware comparator comprises a result register and is configured to store the comparison result in the result register.

10. The communication device of claim 9, wherein the access control circuitry is configured to allow access by the first processor to the result register.

11. The communication device of claim 1, wherein the first processor is a safe processor.

12. The communication device of claim 1, wherein the first processor implements a redundancy mechanism for ensuring safety.

13. The communication device of claim 12, wherein the redundancy mechanism is a mechanism not implemented by the second processor.

14. The communication device of claim 1, wherein the second processor is a secure processor.

15. The communication device of claim 1, further comprising a hardware security module comprising the second processor.

16. The communication device of claim 15, wherein the first processor is arranged outside of the hardware security module.

17. The communication device of claim 1, further comprising a counter configured to count a number of comparisons with a negative comparison result and to generate an alarm signal when a number of negative comparison results exceeds a predetermined value.

18. The communication device of claim 1, wherein the comparing circuit is configured to, after comparing the contents of the first register and the second register, wait for an update of the contents of both the first register and the second register before again comparing the contents of the first register and the second register.

19. The communication device of claim 1, wherein the first processor is configured to execute a first computer program and is configured to extract the message authentication code from the message, to store the message authentication code in the first register and to process the comparison result in accordance with the first computer program.

20. A method for authenticating a message, comprising:
receiving, via a receiver circuit, the message including message data and a message authentication code;
extracting the message authentication code from the message by means of a first processor and storing the message authentication code in a first register;
computing a message authentication code based on the message data by means of a second processor and storing the computed message authentication code in a second register;
comparing the contents of the first register and the second register and providing a comparison result; and
preventing access by the second processor to the first register, allowing access by the first processor to the first register, preventing access by the first processor to the second register, and allowing access by the second processor to the second register.

* * * * *